United States Patent [19]

Stevens, Jr. et al.

[11] Patent Number: 4,697,448
[45] Date of Patent: Oct. 6, 1987

[54] CONTROL SYSTEM FOR TRANSFER APPARATUS

[75] Inventors: Raymond R. Stevens, Jr., Vincentown, N.J.; Robert R. Beisel, Sharon Hill; Stephen F. Griffiths, Philadelphia, both of Pa.

[73] Assignee: The Budd Company, Troy, Mich.

[21] Appl. No.: 917,117

[22] Filed: Oct. 8, 1986

Related U.S. Application Data

[63] Continuation of Ser. No. 586,386, Mar. 5, 1984, abandoned.

[51] Int. Cl.⁴ .................. B21J 13/08; B65G 43/00
[52] U.S. Cl. .................................. 72/405; 72/30; 414/225; 414/730; 414/752; 901/6
[58] Field of Search ............... 72/7, 27, 30, 405; 83/519, 69; 29/701, 703, 563, 33 P; 414/225, 750, 752, 730; 901/9, 6; 361/196, 194, 202; 198/341

[56] References Cited

U.S. PATENT DOCUMENTS

| | | | |
|---|---|---|---|
| 2,106,833 | 2/1938 | Eames | 198/322 |
| 2,259,882 | 10/1941 | Glasner | 72/27 |
| 2,266,861 | 12/1941 | Haase | 72/27 |
| 2,905,239 | 9/1959 | Dietz | 361/202 |
| 3,265,946 | 8/1966 | Johnson | 901/6 |
| 3,632,571 | 8/1974 | Grosuenor et al. | 361/196 |
| 4,144,552 | 3/1979 | Sibalis | 361/196 |
| 4,206,483 | 6/1980 | Nakamura | 360/33.1 |
| 4,386,693 | 6/1983 | Bachman | 414/752 |

*Primary Examiner*—Daniel C. Crane
*Attorney, Agent, or Firm*—Edward M. Farrell; Herman Foster; Thomas I. Davenport

[57] ABSTRACT

An electrical control system is provided for controlling a number of different operations in a transfer apparatus for transferring parts from one die to another. The controls of the operations are independent of each other and need not be made in cascade. Adjustments of any one of the operations may be made without directly affecting the other operations.

14 Claims, 9 Drawing Figures

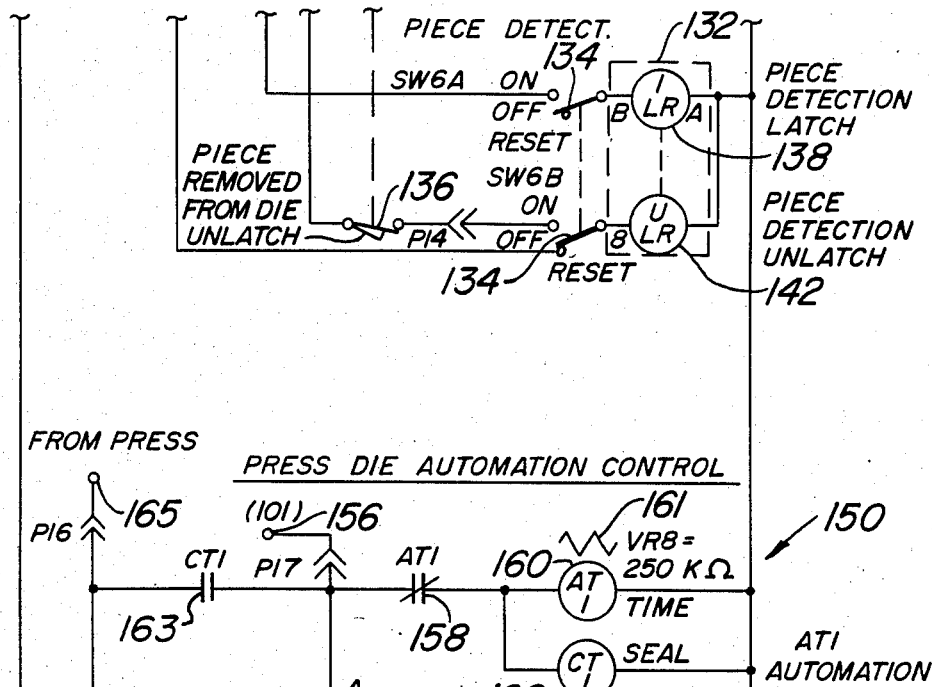

CONTROL SYSTEM FOR TRANSFER APPARATUS

This is a continuation of application Ser. No. 586,386 filed Mar. 5, 1984, now abandoned.

BACKGROUND OF THE INVENTION

Automation equipment involving transferring pieces from one station to another station has been used extensively. Such equipment has generally involved means for taking a piece, such as an automotive part being manufactured, from a first die by suitable gripping means and transferring the piece held to a second die.

Present transfer machines have generally been controlled by fixed programs in a computer programmed to operate in accordance with a predetermined sequence of operations. In a normal manufacturing plant involving manufacture of automotive parts, for example, it is very difficult to maintain extremely close tolerances required for an operation of a programmed system. Because of many variable factors involved, it is often necessary to adjust one of the functions relating to a particular operation involving the transfer of parts. The operations in a typical transfer apparatus may include, for example, the operation of the gripping means, movement of the parts by a shuttle or extendible arm and rotation of the parts.

In such prior art systems, if any one of the operating functions has to be adjusted, it is often necessary to stop production so that adequate changes may be made in the controlling program. Generally, the requirement for even a minor change in a program involves skilled personnel not always readily available.

Another problem in many existing systems is that the various controls involving the transfer apparatus and controls relating to "in-die" operations are located in different places. This is necessitated by the placement of the belt conveyors and other line equipment. This often requires personnel to move back and forth between different locations to perform the necessary adjustments.

Most transfer machines are operated in a series or cascade manner. This means that one function must be completed before a subsequent function may be started. This generally involves a maximum time to complete all the operations. In addition to this, when one function is changed by varying an electrical circuit, it often affects the other functions involved which then must also be adjusted.

OBJECTS OF THE INVENTION

It is an object of this invention to provide a simplified control system for transfer apparatus for transferring a piece from one station to another.

It is a further object of this invention to provide improved means for independently controlling a plurality of operations in a manufacturing process.

It is a further object of this invention to provide an electrical system in which all the necessary controls for the operation is readily available on one panel.

It is a further object of this invention to provide an improved electrical control system for a manufacturing operation in which a relatively unskilled worker may make minor changes in the set-up and timing without the need to stop production.

It is a still further object of this invention to provide an electrical control system which permits independent control of a number of operations without affecting any of the other operations.

It is a further object of this invention to provide an improved electrical control system in which a number of functions may be performed simultaneously to effectively shorten the total time required in a transfer operation.

It is still a further object of this invention to provide an improved electrical control system which provides a safety latching feature which stops production when a piece is stuck in the system.

SUMMARY OF THE INVENTION

In accordance with the present invention, an electrical control system is provided to control various operations in a transfer apparatus. The operations may involve lifting, moving and rotating a piece during the transfer from one operating station to the next. Electrical control means, which may include timers controlled by potentiometers or the like, are independently adjustable to control the operations which may be performed simultaneously with any one adjustment not directly affecting the other operations.

Other objects and advantages of the present invention will be apparent and suggest themselves to those skilled in the art, from a reading of the following specification and claims, taken in conjunction with the accompanying drawings.

DESCRIPTION OF THE DRAWINGS

FIGS. 3A and 3B, which should be combined to provide one diagram, illustrates an electrical circuit for controlling the various operations involved in the present invention;

DESCRIPTION OF THE INVENTION

The present invention will be described generally in connection with the apparatus described in a patent entitled "Transfer Apparatus" U.S. Pat. No. 4,386,693, issued June 7, 1983. While this patent illustrates a typical transfer apparatus in which the present invention may be used, it is apparent that the invention may be used in other types of transfer machines.

Figure 1:
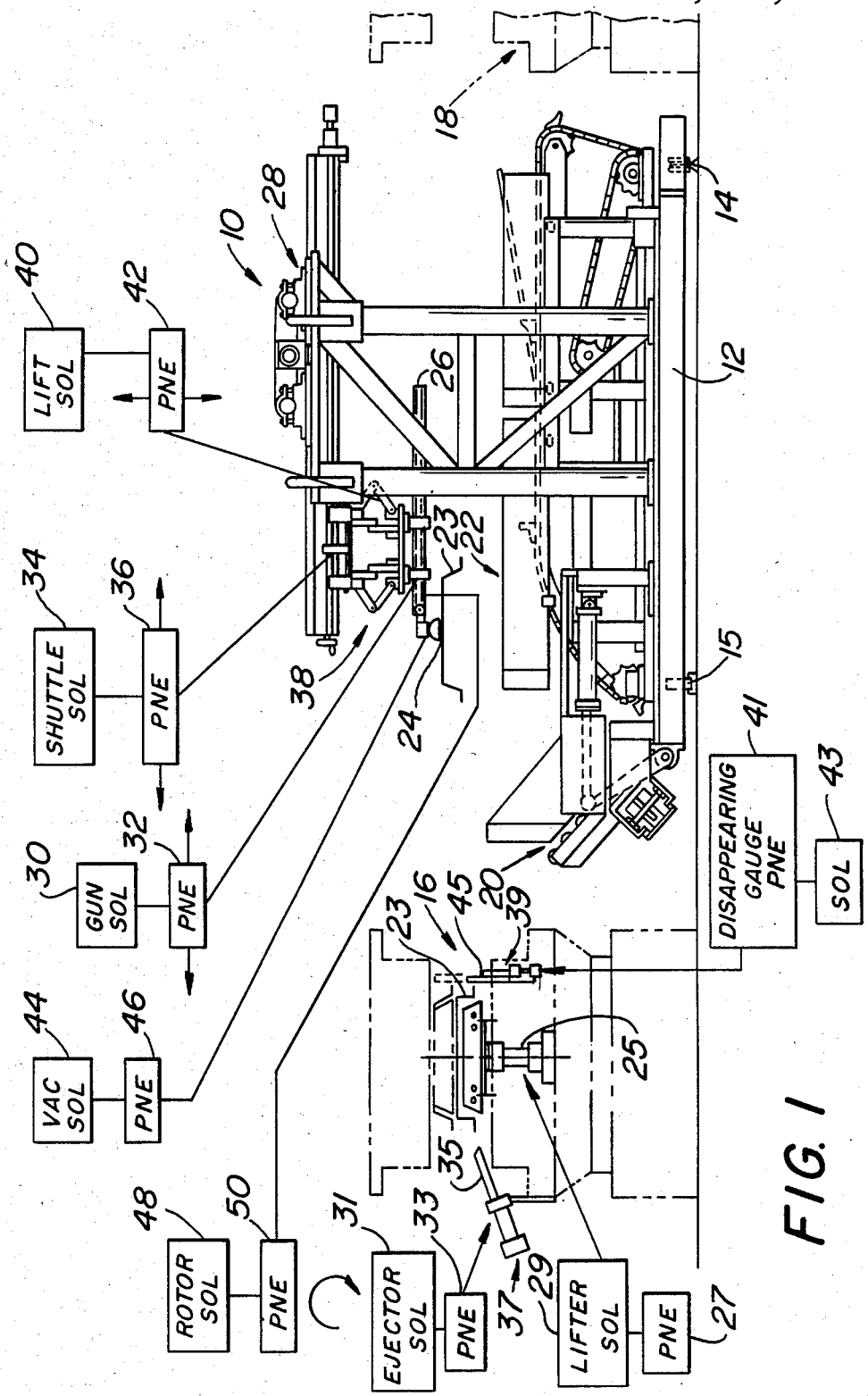
FIG. 1 is a side view of a typical transfer machine along with various blocks schematically illustrating the various operations of the machine, in accordance with the present invention.

Referring to FIG. 1, transfer apparatus 10 includes a base frame 12 movably mounted on wheels 14 and 15 which are adapted to ride on suitable base elements. The transfer apparatus 10, along with a chain conveyor 22, are adapted to move parts such as panels 23 for use in an automobile, from left to right from a first die 16 to a second die 18.

A panel 23 is lifted from the die 16 and dropped on a turnover positioner 20 of the transfer apparatus 10. The panel 23 is then moved over the movable chain conveyor 22. At the end of the conveyor 22, the panel 23 is lifted from the transfer apparatus 10 and passed into the die 18.

During the transfer of a panel 23 from the die 16 to the die 18, a number of different movements involving the transfer apparatus 10 and the panel 23 are required. The present invention is directed to the control means for controlling these movements and are broadly illustrated in the various blocks in FIG. 1.

A feature of the present invention is to include all the controls for the transfer apparatus and "in-die" operations in a single electrical control box or panel. This eliminates the necessity for a worker to move back and forth between different locations to make required adjustments. A number of "in-die" functions are illustrated in FIG. 1, it being recognized that other controlled functions may also be involved.

The die 16 includes a lifting mechanism 25 for lifting a panel 23 to permit it to be ejected. The die lifting controls includes a solenoid 27 adapted to selectively operate a pneumatic device 29 to control the lifting operation.

After the panel has been lifted, it is ejected. The ejection is controlled by the operation of a solenoid 31 which actuates a pneumatic device 33 to move an arm 35 of the ejector 37 to eject the panel 23.

A "so-called" disappearing gauge 39 is used to locate the panel 23 in a loaded position. A solenoid 41 actuates a pneumatic device 43 to move upwardly a blade 45 of the gauge 39 to stop and position the panel 23.

The circuitry for operating the solenoids 27, 31 and 41 is illustrated in FIG. 3.

ith respect to the transfer apparatus 10, a first movement generally involves a horizontal linear motion which is designed to extend a gripping means such as a suction cup 24 into the die 16. A pneumatic cylinder 26, hereinafter called a gun, is employed to advance the suction cup 24. At the same tie, a second horizontal linear movement is also involved and provided by a shuttle 28. Because the gun 26 and the shuttle 28 in effect provide additive horizontal movements, the combination of the gun and the shuttle provides increased horizontal motion. The compounded motion provides an advantage of being able to reach 8 feet, for example, with only 4 feet of equipment.

The electrical control system to be subsequently described includes a gun solenoid 30 which actuates a pneumatic device 32 to cause the gun 26 to be moved horizontally. A shuttle solenoid 34 is adapted to actuate a pneumatic device 36 to cause the carriage or shuttle 28 to be moved horizontally. After the vacuum cup 24 has been extended into the die 16, a lift and lowering mechanism 38 may then be actuated to lower the gun 26 to cause the vacuum cup 24 to engage the panel 23 in the die 16. Actuation of the lift and lowering mechanism 38 is controlled by applying an electrical signal to a lift solenoid 40 which actuates a pneuatic device 42 which controls the lowering and lifting of the gun 26 and vacuum device 24.

After the vacuum device 24, or other gripping means, engages the part involved, a vacuum solenoid 44 actuates a pneumatic device 46 which causes vacuum to be applied to the vacuum cup 24 to hold the panel 23.

The panel 23 may then be lifted from the die 16 with the gun 26 then being actuated to retract the vacuum cup 24 with the attached part into the transfer apparatus. At the same time, the shuttle 28 may also be actuated during the withdrawal movement.

After the panel 23 is located over the conveyor 22, it may be lowered, with the vacuum being discontinued, to cause the panel to drop onto the conveyor.

In order to transfer the panels from the conveyor to the die 18, the vacuum cup 24 including panels from the conveyor must generally be rotated 180°. This is accomplished by a rotor solenoid 48 which actuates a pneumatic device 50 which causes the gun 26 to be rotated. After the gun has been rotated 180°, the arm 26, the shuttle 28 and vacuum cup 24 may then be again actuated and lowered to grip the panel 23 at the end of the conveyor 22. The panel is then lifted and moved in the opposite direction into the die 18.

After the part has been moved into the die 18, the lowering mechanism 38 is actuated to lower the part into the die 18. The vacuum is then removed from the vacuum cup 24 and the part is released in the die 18. The arm 26 and vacuum cup 24 is then lifted and retracted from the die 18, rotated back to their original positions and again extended into the die 16 to repeat basically the same described operation on the next panel.

Figure 2A:
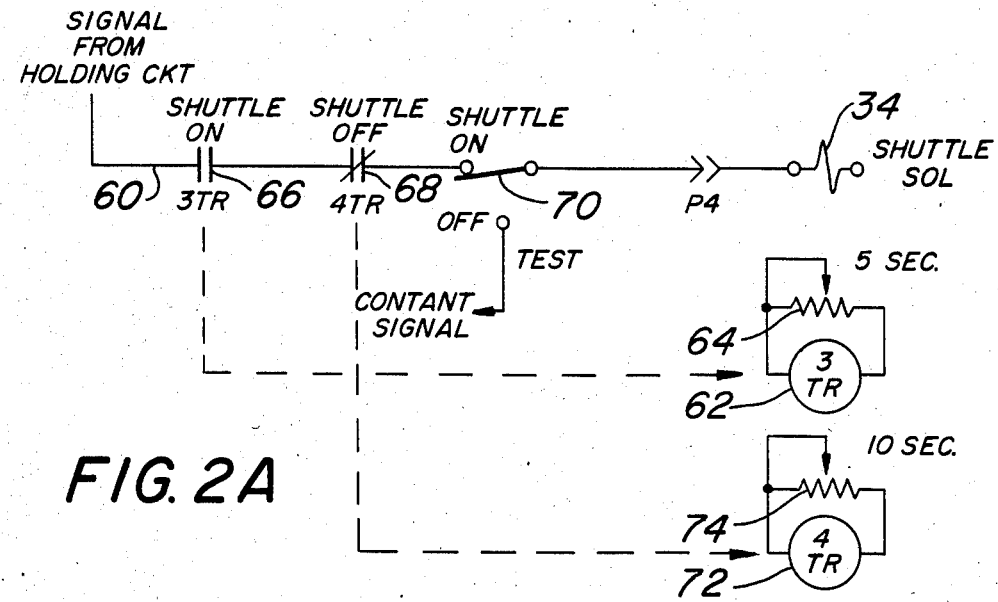
FIG. 2A is a schematic diagram illustrating one embodiment of a basic circuit which may be used in the present invention.

Referring to FIG. 2A, a typical circuit for controlling the dwell times of the various solenoids for the transfer apparatus 10 is illustrated. The basic operations of the circuitry for controllng the gun, vacuum, shuttle, lift and rotary functions, to be described in connection with FIGS. 3A and 3B, all operate in a manner of the circuit of FIG. 2A.

For purposes of explanation, the shuttle function included in FIG. 3 will be described using the same reference numerals in both figures.

The invention signal is applied from the power source through a line 60. A shuttle-on timer relay 62 is set to turn on at a predetermined time by a potentiometer 64. The timing relay 62 closes shuttle-on contacts 66 to permit current to pass through normally closed shuttle-off contacts 68, through a switch 70, set to an "on" position during operation, to the shuttle solenoid 34.

Current continues to flow through the solenoid 34 until the shuttle off contacts 68 open. Contacts 68 are controlled by a shuttle off timing relay 72 which is set to operate at a predetermined time by a potentiometer 74. When the timing relay 72 operates, the contacts 68 open to discontinue current through the solenoid 34. Thus the start and stop of current through the solenoid 34 are controlled by the settings of the timing relays 62 and 72 at both ends of the dwell time of the solenoid 34.

Figure 2B:
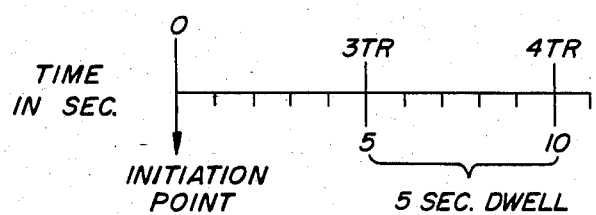
FIG. 2B is a chart illustrating a time sequence of different operations for the circuit illustrated in FIG. 2A.

FIG. 2B illustrates a particular time sequence of an operation of one of the solenoids illustrated. Assume, for example, that it is desired to set a timing relay to start five seconds after a setting. The potentiometer 64 may be used to set the timing relay 62, (FIG. 2A) for example. The solenoid 34 will start to operate at the end of five seconds.

The dwell time or time that current is to flow through the solenoid 34 must then be determined. Assume that this dwell time is 5 seconds. The potentiometer 74 is set to operate the timing relay 72 in ten seconds. When the timing relay 72 operates at the end of 10 seconds, contacts 68 open to discontinue current through the solenoid 34.

Figure 3A:
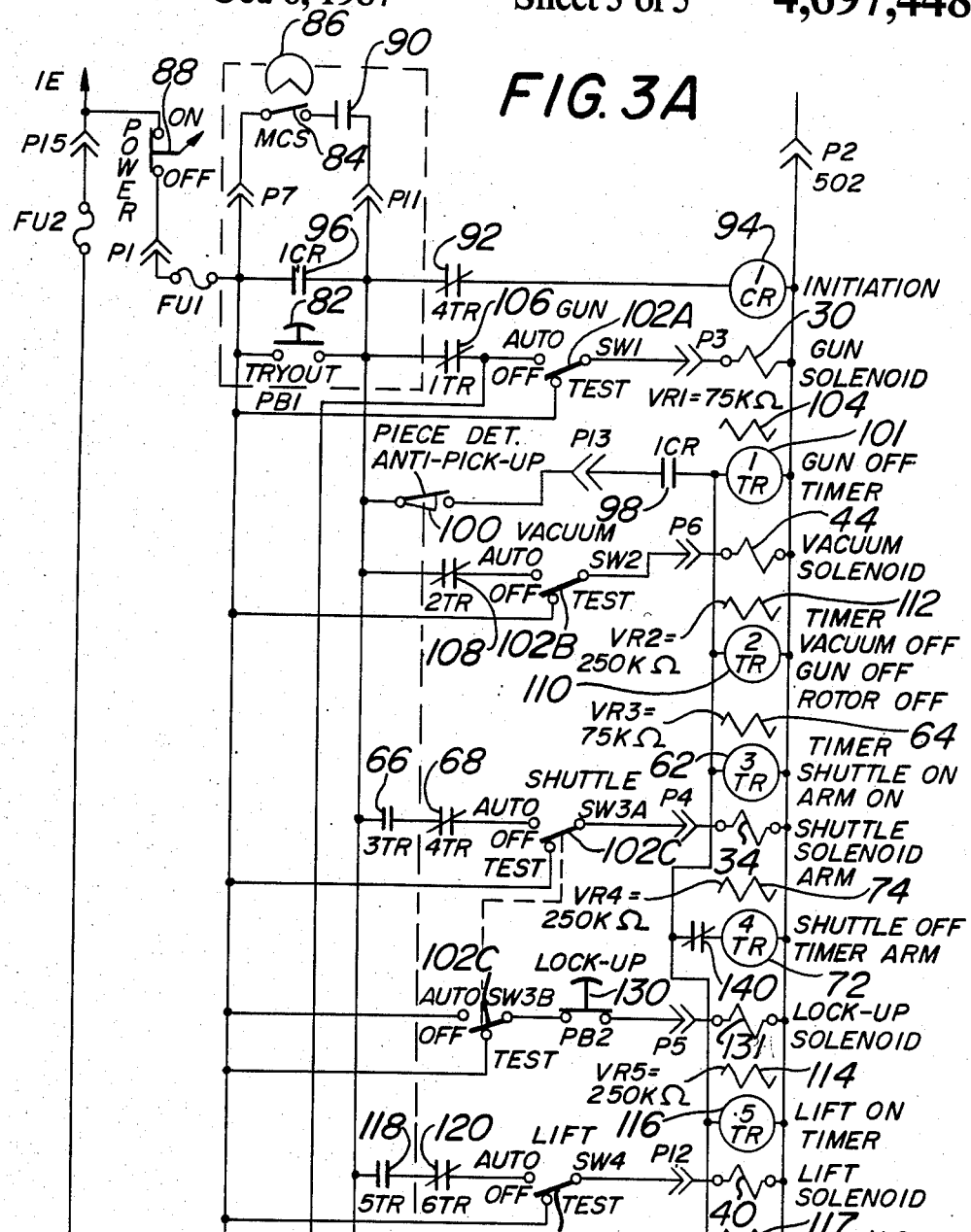

In describing FIGS. 3A and 3B, various conventional symbols are included in addition to the reference numerals. The reason for this is that the conventional symbols interrelate different parts, such as the relays and associated contacts, thereby assisting in understanding the circuits involved.

Referring to FIGS. 3A and 3B, there are two ways to initiate the start of the system. The first involves the operation of a manual switch 82 which is used for testing purposes. The second way is by the operation of a switch 84 by a cam 86 in the transfer apparatus or press. It is assumed that the power switch 88 is on which permits power to be applied to the system. The various numbers preceded by the letter "P" merely indicate pin connections to assure proper connections to external units.

When the switch 84 is closed, press interlock 90 contacts close to permit current through normally closed contacts 92 to actuate an initiation control relay 94.

Actuation of the relay 94 closes contacts 96, which act as a seal or holding contacts to maintain the power once the current starts to flow through the contacts 96. Operation of the relay 94 also closes contacts 98. A switch 100 is a limit switch which is normally closed This switch is optional. This switch provides an anti-pile up feature which prevents the cycle from continuing if there is a piece drop off in the immediate vicinity of the die. A switch 102A is normally set on automatic for the gun shuttle, lift and rotor functions.

Consider the operation of the solenoids 30, 44, 34, 40 and 48, also illustrated in FIG. 1. These solenoids will turn on and off in much the same manner as the circuitry illustrated in FIG. 2A. When the circuit is initiated, power is simultaneously applied to all of the timing relays, as will be described.

With respect to the gun solenoid 30, the start time is controlled by the control relay 94 which close the contacts 96 when the cycle is started to permit current to pass through the solenoid 30. Current continues to flow through the solenoid 30 until a gun off timing relay 101, controlled by a setting of ootentiometer 104, is actuated. Operation of the timing relay 101 opens normally closed contacts 106 through switch 102A, thereby discontinuing the current through the solenoid 30.

With respect to the vacuum solenoid 44, start time is also caused by the initiation of the cycle and actuation of the control relay 94. Current flows through normally closed contacts 108, through the switch 102B set to the on position, to the solenoid 44. The solenoid 44 operates until a vacuum off timing off relay 110, controlled by a potentiometer 112, opens the contacts 108.

With respect to the shuttle solenoid 34, the operation is similar to that described in connection with FIG. 2A. en the timing relay 62, controlled by potentiometer 64, turns on, contacts 66 close. Current passes through contacts 66, closed contacts 68, closed gang switch 102C through the solenoid 34. At the end of the selected dwell time, tlming relay 72, controlled by potentiometer 74, operates to open the contacts 68 to discontinue the current through the solenoid 34.

The lift solenoid 40 is controlled by the start time of timing relay 116, set by potentiometer 114, which operates to close contacts 118. Current then passes through contacts 118, normally closed contacts 120, the switch 102D, to the solenoid 40. At the end of the selected time duration, the lift off timer 116, controlled by potentiometer 117, operates to open the contacts 120 to discontinue the current through the solenoid 40.

Finally, the rotor solenoid 48 is controlled by a timing relay 122, set by a potentiometer 124, which operates to close contacts 126. Current passes through contacts 126 normally closed contacts 128, switch 102E, to the solenoid 48, at the end of a predetermined time. In this case, the rotor solenoid 48 shuts off as a function of the vacuun off timer 110, which open contacts 128 to discontinue current through the solenoid 48. The action of shutting off the vacuum also acts to reset the rotor to the start position.

A feature included in the present invention involves a so-called lock-up switch 130 which involves a pushbutton. This is provided primarily for safety. It may also be used with a swing type arm, rather than the linear extendible shuttle 28, and permits the swing arm to be locked in its up position out of the way of the die. When the lock-up switch 130 is used in conjunction with the ganged shuttle switch 102C, lock-up can be accomplished by having current applied to a lock-up solenoid 131.

The lock-up itself is a manual function. The switch 102C is put in a test position in order to lock up the arm or the shuttle. For example, if a machinist is working on the die, he locks the extractor out of the way so he can work on the die and not have to worry about it interfering with him.

Another feature of the present invention involves latching. With respect to the latching circuit 132, a latch is effected by means of setting the gang switch 134. Latch relay 138 is set by the initiation signal from contacts 106. An external signal from a power source may be through a limit switch 136. This switch 136, or other external signal may be used to indicate that a part has been removed from the die. The switch 136, for example, may be associated with the conveyor and responsive only when a part is received from the die 16. If, for some reason, the part is dropped within the die and before reaching the conveyor, the switch 136 will not be actuated.

When the initiation signal is received through cam switch 84 and contacts 90, the latch relay 138 will be latched and open contacts 134 to prevent shuttle off timing relay 72 from starting its time. This will hold the shuttle until a signal is received through switch 136 and another part of the switch 134 to unlatch the relay 142. The shuttle will go all the way to its full physical travel because it was never shut off by contacts 68 because contacts 140 are open.

The contacts of the latch 132 are generally available for external use by an operator. One such use may involve tripping an automatic feeder, so that the piece detection contacts 136 indicates that when part is out of the die. If an unlatch signal is not received, the next piece is not fed.

Switch 134 has three positions. The "on" position activates the circuit and the "off" position disconnects the latch circuit without affecting the rest of the cycle involved. If a piece gets stuck in the system, the machine will shut down. If the piece is not extracted, the shuttle will go to its full travel and the cycle will not be completed. The system will remain on "hold" because the shuttle off timing relay 68 does not time out, the contacts 92 will not open and the system will not clear.

The third position of the piece detection gang switch 134 is reset. This is a spring return switch and if there is a piece detection fault and the piece was not pulled out of the die and the arm is all the way in the extract position, a machinist or line worker must correct the situation, remove the piece from the die physically by hand, and push the latch switch 134 to the reset position. This will reset unlatch relay 142 and allow the cycle to clear itself.

Another feature of the present invention is press die automation control. This control is illustrated as being in three sections 150, 152 and 154. These three sections are related to the "in-die" operations involving lifting, ejecting and gauging a part described in connection with FIG. 1. The three sections all operate substantially the same and therefore only one section 150 will be described.

Referring to the section 150, power is applied from a source 156. This may result from a cam closing in the machine that initiates the automation timing device. The power of point 156 causes current to pass through contacts 158 to operate a timing relay 160 controlled by a potentiometer 161. The relay 162 closes contacts 163 which provide a seal or holding means.

The signal from terminal 165 cause current through contacts 163 and normally closed switch 164 to provide power to the solenoid 27.

At the end of the time set by the relay 160, the contacts 158 will open. The operation of the solenoid 27 continues as long as the relay 160 remains operative. When relay 160 becomes reenergized, the contacts 163 open to deenergize solenoid 27.

The various sections 150, 152 and 154 may be used in setting up the die system to perform different functions. The various times may be tested and determined prior to actually finalizing the time setting in the controls to be used in the manufacturing die operation.

Figure 4:
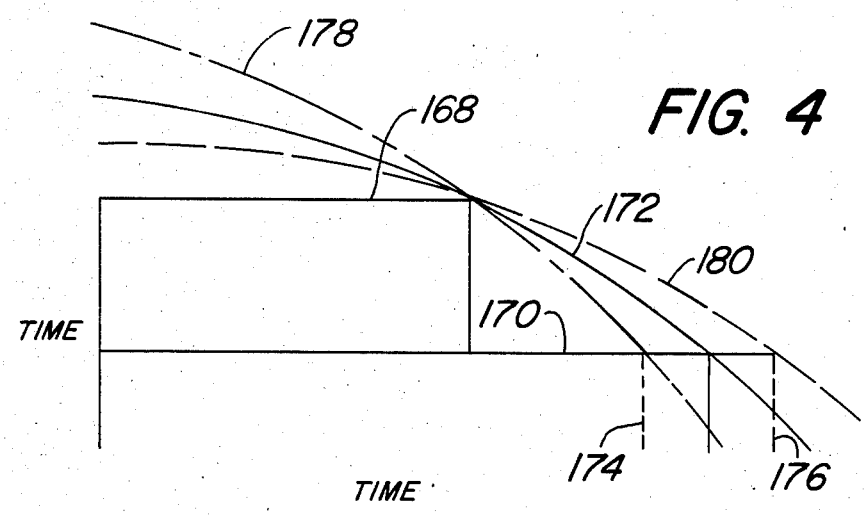
FIGS. 4 and 5 are charts shown for the purpose of illustrating different types of operations when different adjustments are made in the electrical circuits illustrated.

Referring to FIG. 4, two different functions are illustrated as being performed at the same time. A line 168 may represent the lift time function and a second line 170 may represent the gun time function. When both functions are taking place at the same time, a resultant motion takes place and is represented by line 172. Line 172 may generally be considered as the vector resultant of the lines 168 and 170.

In FIG. 4, it may be assumed for purposes of this explanation that the lift time represented by the line 168 is constant and the gun operation time represented by the line 160 is varied from a shorter time to a longer time.

Figure 5:
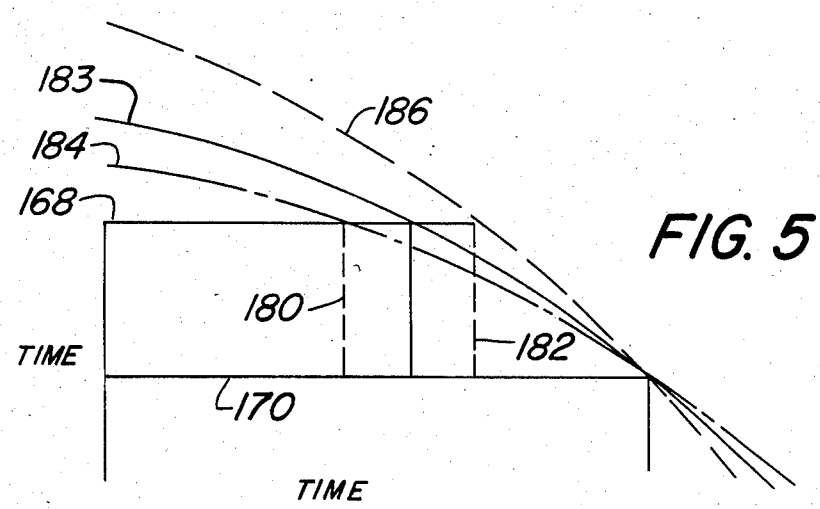

When the gun operation involves a shorter time, as represented by line 174, the resulting motion is represented by a line 180 In like manner, when a longer time for the gun is involved, the resultant motion is indicated by a line 180. It is seen that the combined time of the various resultant motions are much shorter than if the lines 168 and 170 were cascaded as in the case of may prior art systems Referring to FIG. 5, a situation is illustrated where the gun advance line 170 is maintained constant and the lift time line 168 is varied from a shorter time represented by a line 180 to a longer time represented by a line 182. When the shorter lift time is involved, the resultant motion is illustrated by a vector line 184. When the longer lift time is used, the resultant movement is represented by the line 186. Again, it is seen that performing two or more functions at the same time greatly reduces the total movement time involved. The normal resultant time is represented by vector line 183.

Figure 6:
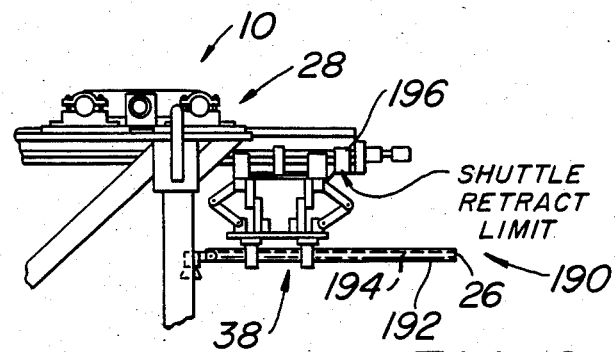
FIG. 6 is a partial view of another embodiment of the present invention.

FIG. 6 illustrates another embodiment of the gun wherein the shuttle is fully positioned to the right in the fully retracted position. A gun 190 includes an outer tube 192 and a slidable extendible inner arm 194. This provides a longer extension for the gun into the dies. A limit switch 196 is actuated when the shuttle is fully to the right. Actuation of this switch may be used to clear the cycle of operation in much the same manner as the shuttle off timer previously described.

Figure 7:
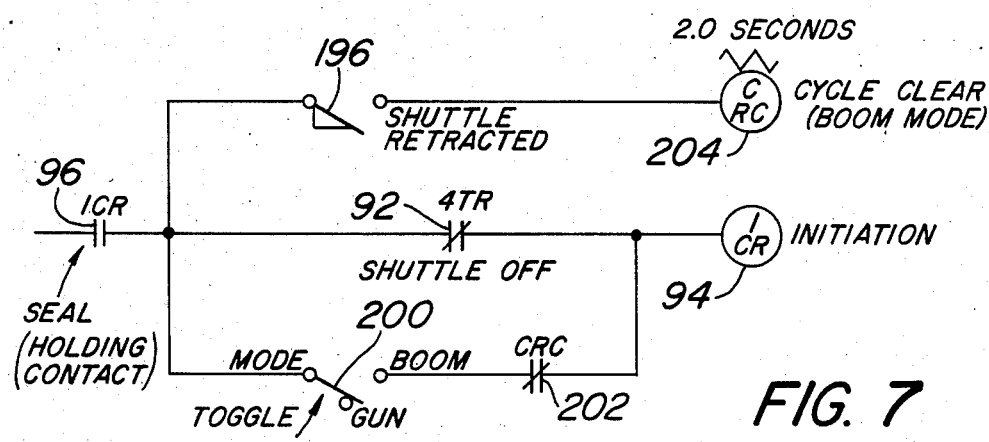
FIG. 7 is an electrical schematic diagram related to the operation of the embodiment illustrated in FIG. 6.

Referring to FIG. 7, a modification of the circuitry of FIGS. 3A and 3B permits the circuitry to operate in a so-called gun mode or boom mode. When a toggle switch 200 is set in the gun mode, the operation of the circuitry of FIGS. 3A and 3B will be as previously described.

When the operation is set to the boom mode contact, the operation illustrated in FIG. 6 is effected. Current is applied through normally closed cycle clear contacts 202 so that the normal described takes place. When the shuttle is retracted, the limit switch 196 closes and current is applied to a cycle clear relay 204 which is set to operate at a fixed time to open contacts 202 to end the cycle. The shuttle remains in the retracted position illustrated in FIG. 7.

A typical example of a type of time delay used in the present invention is one manufactured by Potter and Brumfield, having a stock number CLF-41-70010. The potentiometers are conventional and may be 75K or 250K ohm potentiometers made by Allen Bradley, stock number 3852A-165.

It is seen that the present invention is independent of built-in programs. If trouble is encountered in the manufacturing operation, as a result of one of the function being slightly off, a machinist may readily adjust that function by controlling the particular timer involved by a potentiometer setting. This eliminates the necessity of highly skilled programmers or engineering personnel having to be on duty during the manufacturing operations. It also eliminates down time in which many workers are kept idle as the machine is being reprogrammed.

The present invention has provided a control system in which all of the controls may be installed in a relatively compact panel. The control in the panel may be used to control an in-die operation as well as various other functions relating to the overall operation.

The present invention has also provided a system in which some or all of the functions may be selectively operated at the same time to shorten the total operating time. Performing two or more functions at the same time greatly reduces the time involved for the total operation.

What is claimed is:

1. In a manufacturing system
   a. a transfer machine for performing different independent operations including gripping, moving, rotating, lowering and lifting a component,
   b. a source of electrical power;
   c. a plurality of solenoids to receive power from said power source to control the start and stop times of said operations in said transfer machine;
   d. first normally open and second normally closed serially connected electrical contacts connected between said source of power and each of said solenoids to permit power to be applied to said solenoids when said first and second contacts are closed to start said operations;
   e. first and second timing relays having adjustable means for controlling the opening and closing of said first and second electrical contacts,
   f. means for connecting said source of power simultaneously to all of said first and second relays, and
   g. said first timing relay being operative to close said first normally open contacts to connect said source of power to said solenoids to start said operations in said transfer machine and said second timing relay being operative to open said normally closed contacts to disconnect said solenoids from said source of power to stop said operations in said transfer machine.

2. The invention control system as set forth in claim 1 wherein adjustable means are provided for said timing relays to selectively vary the start and end of said operations to control said time durations.

3. The invention as set forth in claim 2 wherein said adjustable means comprise potentiometers.

4. The invention control circuit as set forth in claim 3 wherein means are provided for applying power to said timing relays at the same time, with the operations of said timers being selectively controlled by said potentiometers.

5. The invention as set forth in claim 4 wherein said plurality of solenoids responsive to said timing relays are provided for operating a plurality of pneumatic devices.

6. The invention as set forth in claim 5 wherein said transfer machine includes a conveyor for transferring parts from one station to another station.

7. The invention as set forth in claim 6 wherein said stations comprise dies for forming a part.

8. The invention as set forth in claim 7 wherein said transfer machine further includes means for gripping a part, means for moving said gripping means in and out of said dies, means for rotating said gripping means, and means for lowering and lifting said gripping means.

9. The invention as set forth in claim 8 wherein said pneumatic devices control the operations of said means for moving, rotating, lowering and lifting of said gripping means.

10. The invention as set forth in claim 9 wherein means including die control means including timing relays and adjustable potentiometers are provided to control in-die operations including means for lifting, ejecting and positioning a part within said die.

11. The invention as set forth in claim 10 wherein a latch circuit is provided to stop an operating cycle of said transfer machine when a part is not transferred from said first die to said conveyor belt.

12. The invention as set forth in claim 11 wherein manual means are provided to lock the parts of the transfer machine outside of the die to permit work to be done on the die.

13. The invention as set forth in claim 12 wherein all of said timing relays and potentiometers for said transfer machine and said first die are located in a single control box to permit an operator to control all the functions of said transfer machine and said first die from a single location.

14. The invention as set forth in claim 13 wherein the positions of said means for moving said gripping means may be selectively retracted to one of two different positions.

* * * * *